United States Patent
Katz et al.

(10) Patent No.: US 9,444,792 B2
(45) Date of Patent: Sep. 13, 2016

(54) DYNAMIC TUNNEL FOR REAL TIME DATA COMMUNICATION

(71) Applicant: ORACLE INTERNATIONAL CORPORATION, Redwood Shores, CA (US)

(72) Inventors: Henry Katz, Brookline, MA (US); Rolando Herrero, Derry, NH (US)

(73) Assignee: Oracle International Corporation, Redwood Shores, CA (US)

(*) Notice: Subject to any disclaimer, the term of this patent is extended or adjusted under 35 U.S.C. 154(b) by 88 days.

(21) Appl. No.: 14/519,519

(22) Filed: Oct. 21, 2014

(65) Prior Publication Data
US 2016/0112372 A1    Apr. 21, 2016

(51) Int. Cl.
H04L 29/06 (2006.01)
H04L 29/08 (2006.01)
H04L 12/46 (2006.01)

(52) U.S. Cl.
CPC ......... *H04L 63/029* (2013.01); *H04L 12/4633* (2013.01); *H04L 65/608* (2013.01); *H04L 67/14* (2013.01)

(58) Field of Classification Search
USPC ........................................................ 726/15
See application file for complete search history.

(56) References Cited

U.S. PATENT DOCUMENTS

| 2006/0168297 | A1* | 7/2006 | Kang | G10L 19/173 709/231 |
| 2013/0283037 | A1 | 10/2013 | Katz et al. | |
| 2013/0322255 | A1* | 12/2013 | Dillon | H04L 47/22 370/236 |

OTHER PUBLICATIONS

"Comparative synthesis of the 3 main European projects dealing with Cooperative Systems (CVIS, Safespot and Coopers) and description of Coopers"; G Toulminet et al; Proceedings of the 11th International IEEE Conference on Intelligent Transportation Systems Beijing, China, Oct. 12-15, 2008 ; p. 809-814.*
"CoolStreaming/DONet: A Data-Driven Overlay Network for Efficient Live Media Streaming" ; X Zhang et al; IEEE Computer and Communications 2005; 14 pages.*
Oracle Communications; Oracle Data Sheet; "Acme Packet 4500"; http://www.oracle.com/us/industries/communications/acme-packet-4500-ds-1990148.pdf; last downloaded Oct. 20, 2014.

\* cited by examiner

*Primary Examiner* — Jason Lee
(74) *Attorney, Agent, or Firm* — Miles & Stockbridge P.C.

(57) ABSTRACT

A tunneled session management ("TSM") server manages a dynamic datagram tunnel ("DDT") for a real time communication ("RTC") with a TSM client. The TSM server establishes a stream based tunnel with the TSM client and then establishes the RTC via the stream based tunnel, where the RTC includes communicating a first channel for signaling traffic and a second channel for media traffic. Then, it is determined whether to establish the DDT for communicating the media traffic, and if so, the DDT is established and the second channel is communicated via the DDT while the first channel is maintained on the stream based tunnel.

19 Claims, 3 Drawing Sheets

US 9,444,792 B2

DYNAMIC TUNNEL FOR REAL TIME DATA COMMUNICATION

FIELD

One embodiment is directed generally to a communication network, and in particular to delivering real time media over a communication network.

BACKGROUND INFORMATION

Many enterprises have moved from telephony services using the Public Switched Telephone Network ("PSTN") (provided by a traditional telephone company) to telephony services using the Internet Protocol ("IP") (provided by an IP Telephony service provider). Such services are commonly known as Voice over IP ("VoIP") or IP Telephony. IP Telephony uses an IP network (e.g., the Internet) as a backbone and can thus provide advanced features such as video conferencing, call recording, and call forwarding.

SUMMARY

Embodiments manage a dynamic datagram tunnel ("DDT") for a real time communication ("RTC") with a tunneled session management ("TSM") client. Embodiments establish a stream based tunnel with the TSM client and then establish the RTC via the stream based tunnel, where the RTC includes communicating a first channel for signaling traffic and a second channel for media traffic. Then, it is determined whether to establish the DDT for communicating the media traffic, and if so, the DDT is established and the second channel is communicated via the DDT while the first channel is maintained on the stream based tunnel.

DETAILED DESCRIPTION

One embodiment provides real time communication ("RTC") services in a network environment by establishing a dynamic datagram tunnel ("DDT") that carries real time media traffic between end users and remote servers, while traversing security devices such as firewalls. Accordingly, by traversing security devices, this embodiment provides secure RTC services. Further, by using a datagram tunnel, this embodiment addresses RTC requirements such as call quality (which may be affected by impairments such as latency, packet loss, and/or jitter).

Figure 1:
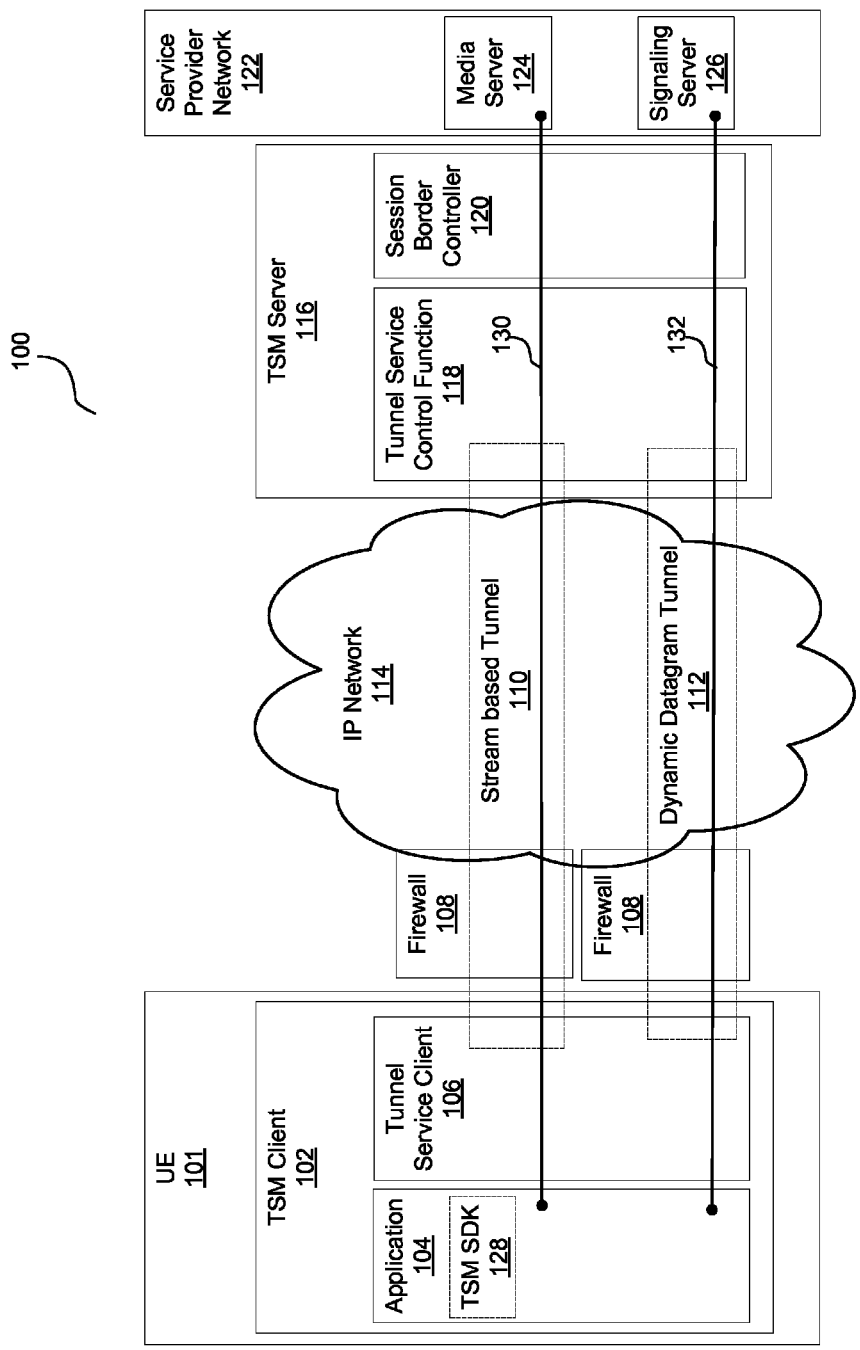
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 101 that communicates RTC, over an Internet Protocol ("IP") network 114, with a media server 124 and a signaling server 126 within a service provider network 122. RTC refers to a mode of communication in which users exchange information instantly or with negligible latency. Thus, "real time" is synonymous with "live." Example applications for RTC include voice and/or video calls, application streaming, softphones, and remote desktop applications. UE 101 may be any device used by an end-user for communication, such as a smartphone, a laptop computer, a tablet, etc.

In order to communicate media and provide RTC, UE 101 communicates with media server 124 and signaling server 126 over two channels: a first channel 130 for signaling traffic via a Session Initiation Protocol ("SIP"), and a second channel 132 for media traffic. SIP is a signaling communications protocol, conventionally used for controlling multimedia communication sessions such as voice and video calls over IP networks.

Network 100 further includes a tunneled session management ("TSM") client 102 (included within UE 101) and a TSM server 116 that, together, establish and manage tunnels (e.g., 110 and 112) for supporting RTC over IP network 114. In general, using a tunnel for communication refers to using a delivery protocol to encapsulate a different payload protocol. TSM client 102 includes a tunnel service client ("TSC") 106 and an application 104. In one embodiment, application 104 is SIP based and relies on a TSM library such as the TSM library provided by Oracle's TSM software development kit ("SDK") 128. TSM server 116 includes a tunnel service control function ("TSCF") 118 and a session border controller ("SBC") 120. SBC 120 is a device regularly deployed in Voice over IP ("VoIP") networks to control the signaling, and typically also the media streams, involved in setting up, conducting, and tearing down phone calls or other interactive media communications.

Network 100 further includes security devices such as firewalls 108 or proxies (not shown) that provide security for end user traffic. In general, a firewall is a software or hardware-based network security system that controls the incoming and outgoing network traffic based on applied rules. In network 100, tunnels 110, 112 may traverse firewalls 108 so that RTC services are provided in a secure manner.

Figure 2:
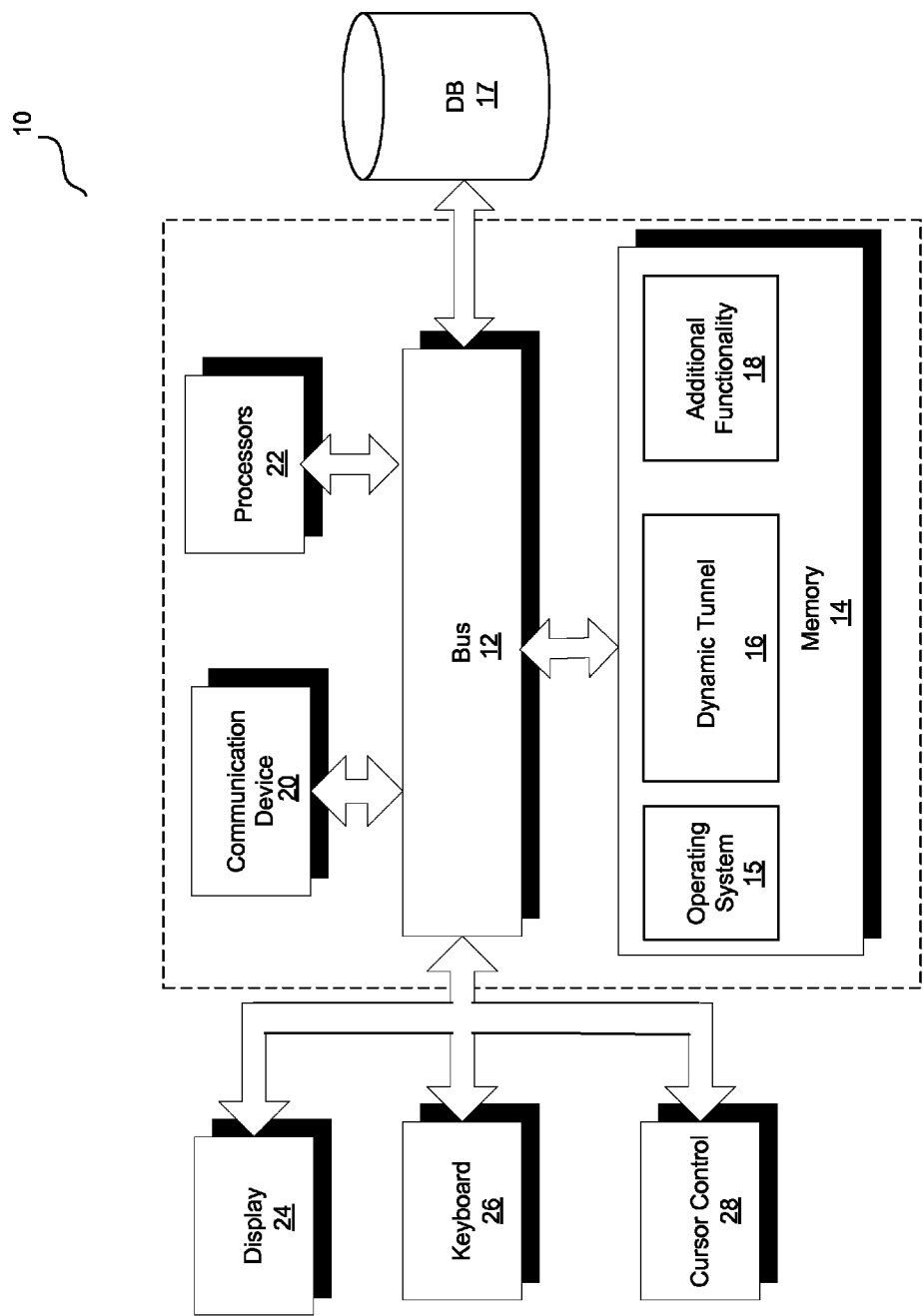
FIG. 2 is a block diagram of a computer server/system in accordance with an embodiment of the present invention.

FIG. 2 is a block diagram of a computer server/system 10 in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a dynamic tunnel module 16, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a dynamic tunnel module 16 for providing secure RTC communications, and all other functionality disclosed herein. In one example embodiment, dynamic tunnel module 16 may include TSM server 116 of FIG. 1. System 10 can be part of a larger system, such as added functionality to the "Acme Packet 4500" from Oracle Corp. Therefore, system 10 can include one or more additional functional modules 18 to include the additional functionality. A database 17 is coupled to bus 12 to provide centralized storage for modules 16 and 18.

Referring again to FIG. 1, with known systems, when communicating first channel 130, for signaling traffic via SIP, and second channel 132, for media traffic, between UE 101 and servers 124, these channels may not go through firewalls 108 because firewalls 108 are normally filtered to a specific port and transport type and may only pass one type of traffic.

One known solution to communicate both of these channels through firewalls 108 is to encapsulate both channels within a tunnel with a delivery protocol such as a transmission control protocol ("TCP"). TCP is one of the core protocols of the IP suite and provides reliable, ordered, and error-checked delivery of a stream of octets between programs running on computers connected to an IP network such as local area network, intranet, or the public Internet. Accordingly, a TCP tunnel is stream based. The resulting TCP tunnel that encapsulates the SIP channel (i.e., first channel 130) and the media channel (i.e., second channel 132) can then traverse a firewall 108.

One disadvantage with this known approach is that this tunnel runs over TCP which is a stream based protocol and therefore not appropriate for media type of traffic, as media is susceptible to delay and jitter.

In contrast to the known solutions, one embodiment of the present invention dynamically supports two concurrent tunnels: a stream based tunnel 110 for communicating first channel 130 for signaling traffic, and a dynamic datagram tunnel ("DDT") 112 for communicating second channel 132 for media traffic. A datagram is a basic transfer unit associated with a packet-switched network. For such datagram, the delivery, arrival time, and order of arrival need not be guaranteed by the network. In this embodiment, stream based tunnel 110 may use a stream based protocol such as TCP or a Transport Layer Security ("TLS") protocol, while DDT 112 may use a protocol appropriate for media such as a User Datagram Protocol ("UDP") or a Datagram Transport Layer Security ("DTLS") protocol.

TLS is a cryptographic protocol designed to provide communication security over the Internet. UDP is a protocol that uses a simple connectionless transmission model with a minimum of protocol mechanism. Applications that do not require the reliability of a TCP connection may instead use UDP which emphasizes low-overhead operation and reduced latency rather than error checking and delivery validation. DTLS protocol provides communications privacy for datagram protocols. UDP and DTLS are optimized for real time media transport. On the contrary, TCP and TLS have head of line blocking issues which may be further aggravated by possible extensive packet loss and network latency. However, TCP/TLS are needed for some VoIP services where signaling (e.g., call invites) must arrive via a TCP channel in order to "wake up" a called party. TCP/TLS firewall bindings are usually kept open much longer than those of UDP/DTLS.

In one embodiment, DDT 112 is provided by dynamically determining whether to use a single stream based (e.g., TCP or TLS based) tunnel or to use both a stream based tunnel and a datagram based (e.g., UDP or DTLS based) tunnel. In one embodiment, a switch may be provisioned (e.g., programmed) at the client (e.g., within TSM client 102) so that, while communicating over an existing stream based tunnel 110, the client may designate a specific real time protocol ("RTP") channel to run in DDT mode. Accordingly, DDT service is provided by creating on demand datagram tunnels based on client configuration. Upon activation of such switch, TSM client 102 creates a parallel datagram based tunnel, DDT 112, which is reliable for media and also minimizes latency. Then, TSM client 102 moves the designated RTP to DDT 112, while SIP remains on stream based tunnel 110. Accordingly, based upon the state of the switch, TSM client 102 dynamically moves RTP between stream based tunnel 110 and DDT 112 to improve voice quality.

In one alternative embodiment, the decision on whether to use only stream based tunnel 110 or to use both stream based tunnel 110 and DDT 112 may be based on the quality of the two tunnels instead of, or in addition to, the status of a switch at the client.

In one embodiment, based on the status of DDT service at TSM client 102, TSCF 118 of TSM server 116 provides configuration to disable/enable DDT service at TSCF 118.

In one embodiment, when DDT service is enabled at TSM client 102, the protocol used to establish DDT 112 is based on the protocol of the existing stream based tunnel 110. If DDT service is enabled while stream based tunnel 110 is TCP based, DDT 112 will be UDP based running on the same port as stream based tunnel 110. If DDT is enabled while stream based tunnel 110 is TLS based, DDT 112 tunnel will be DTLS based running on the same port as stream based tunnel 110. In this embodiment, when DDT service is enabled, TSCF 118 of TSM server 116 may detect any missing tunnel pairs and warn TSM client 102.

In one embodiment, DDT service is activated at TSM client 102 and TSM server 116 according to the following functionality:

Application 104 at TSM client 102 creates one TCP based or TLS based "always on" regular tunnel (i.e., stream based tunnel 110). For example, a TSM library at application 104 creates stream based tunnel 110 by executing a corresponding application programming interface ("API").

Once a SIP call is established on stream based tunnel 110 and RTP is negotiated by Session Description Protocol ("SDP") information exchange, an RTP media socket is created on stream based tunnel 110 by executing a corresponding API. SDP is a format for describing streaming media initialization parameters.

To induce DDT 112 on RTP media socket, it is marked to run on a new separate datagram tunnel, by executing a corresponding API on an RTP media socket to set a related parameter.

When a binding function is executed on RTP media socket and since it resides on stream based tunnel 110, the client state machine ("CSM") at TSM client 102 sends a TSCF service request to TSM server 116 to initiate DDT services.

When TSM server 116 receives the TSCF service request, it reserves a new datagram tunnel (i.e., DDT 112) which is UDP or DTLS based if stream based tunnel 110 is TCP or TLS based, respectively. TSM server 116 sends a service response back to TSM client 102 indicating the TSCF tunnel identifier ("TID") of DDT 112.

CSM then negotiates DDT 112 by sending a configuration request and processing the corresponding response. At this point, CSM moves RTP media socket from stream based tunnel 110 to DDT 112.

While DDT 112 is being negotiated and until the RTP media socket is moved from stream based tunnel 110 to DDT 112, all traffic sent/received by the RTP media socket is sent on stream based tunnel 110.

When stream based tunnel 110 is terminated (i.e., by executing an API) DDT 112 is also terminated. If connectivity brings down stream based tunnel 110 or DDT 112, the CSM mechanism to reestablish connectivity will try to bring either tunnel back up.

In one embodiment, in the most common scenario and to guarantee performance, TCP/TLS tunnels (i.e., stream based tunnel 110) are used for sending/receiving signaling and connection maintenance information, and UDP/DTLS tunnels (i.e., DDP 112) are used for sending/receiving media (i.e., audio/video/fax). In this embodiment, during datagram tunnel reservation, TSM server 116 reserves a new datagram tunnel (i.e., DDT 112) that is configured to provide the same inner IP address as that used by the main stream tunnel (i.e., stream based tunnel 110). For example, if 1.1.1.2 is used for a TLS tunnel, 1.1.1.2 will be also used for the matching DTLS tunnel, thereby guaranteeing transparent transition of media traffic from stream based tunnel 110 to DDT 112. Accordingly, SIP signaling will use the IP address of TLS tunnel 1.1.1.2 and SDP offer (or answer) will include the same IP address: 1.1.1.2. In this embodiment, TSM server 116 associates assigned IP addresses with specific tunnels and routes packets via the corresponding tunnels.

In one embodiment, DDT service is one of the assigned services that a TSCF interface can have. If it is present in the corresponding comma separated assigned services list, DDT service will be enabled for the applicable TSCF interface, and if it is absent, DDT service will be disabled. By default, DDT service is disabled.

In one embodiment, TSC client 102 can request DDT service by sending a client service request message. Upon receiving this request, TSCF 118 at TSM server 116 checks if DDT service is enabled for the TSCF interface on which the client service request is received. If DDT service is enabled TSCF 118 sends a response message indicating success. Otherwise TSCF 118 sends a response message indicating that DDT service is unavailable.

In one embodiment, DDT service is requested by the client application (i.e., application 104) via an API, for example, by setting the appropriate TSM SDK socket option as follows:

```
tsc_so_tunnel_transport tunnel_tranport =
    tsc_so_tunnel_transport_datagram_only;
int result = tsc_setsockopt(rtp_socket, SOL_SOCKET,
SO_TSC_TUNNEL_TRANSPORT,
        (char *)&tunnel_tranport,
        sizeof(tsc_so_tunnel_transport));
``` where:

```
typedef enum
{
    tsc_so_tunnel_transport_default = 0,
    tsc_so_tunnel_transport_datagram_preferred,
    tsc_so_tunnel_transport_datagram_only,
    tsc_so_tunnel_transport_stream_preferred,
    tsc_so_tunnel_transport_stream_only,
} tsc_so_tunnel_transport;
```

In this embodiment, if tsc_setsockopt returns −1, the option has not been set correctly. If it returns 0, it has been set correctly but DDT service will not be officially enabled until the new datagram tunnel (i.e., DDT 112) is created. A new notification tsc_notification_ddt can be used to notify TSM client 102 about DDT enablement. The following pseudo-code illustrates how the notification is enabled and further shows callback:

```
tsc_notification_enable(handle, tsc_notification_ddt,
    ddt_notification, NULL);
void ddt_notification(tsc_notification_data *notification)
{
    tsc_notification_ddt_info_data *ddt_data =
(tsc_notification_ddt_info_data *)notification->data;
        if (ddt_data && ddt_data->available == tsc_bool_true) {
            if (ddt_data->enabled == tsc_bool_true) {
                printf("ddt enabled on socket %d\n", ddt_data->socket);
            } else {
                printf("ddt disabled on socket %d\n", ddt_data->socket);
            }
        } else {
            printf("ddt not allowed on socket %d\n",
            ddt_data->socket);
        }
}
```

The fourth NULL parameter in tsc_notification_enable is an opaque/private data pointer that can be recovered in the tsc_notification_data structure upon callback.

Command Line Interface (CLI) Commands

In one example embodiment, the interface configuration is as follows:

```
tscf-interface
    realm-id              access
    state                 enabled
    max-tunnels           100
    local-address-pools   lp-1
    assigned-services     SIP, DDT
    tscf-port
        address           192.168.27.113
        port              4567
        transport-protocol        TCP
        tls-profile
        rekey-profile
    tscf-port
        address           192.168.27.113
        port              4567
        transport-protocol        UDP
```

```
        tls-profile
        rekey-profile
        last-modified-by      admin@console
        last-modified-date    2011-08-30 11:09:43
```

In this example embodiment, the changes to the corresponding Extensible Markup Language ("XML") file are as follows:

```
<tscfInterface realmID='access'
    state='enabled'
    maxTunnels='100'
    assignedServices='SIP, DDT'
    options=''
    lastModifiedBy='admin@console'
    lastModifiedDate='2011-08-30 11:09:43'
    objectId='33'>
    <key>access</key>
    <localAddressPool name='lp-1'/>
    <tscfPort address='192.168.27.113'
        port='4567'
        transProtocol='TCP'
        tlsProfile=''
        rekeyProfile=''
    <tscfPort address='192.168.27.113'
        port='4567'
        transProtocol='UDP'
        tlsProfile=''
        rekeyProfile=''
</tscfInterface>
```

In one embodiment, the assigned services parameter is real-time reconfigurable. However, new values are only applied to newly established tunnels.

In one embodiment, messages exchanged between clients are logged by TSM SDK 128 in their corresponding client logs. In this embodiment, control messages forwarded by the session director are logged in a corresponding data log.

Figure 3:
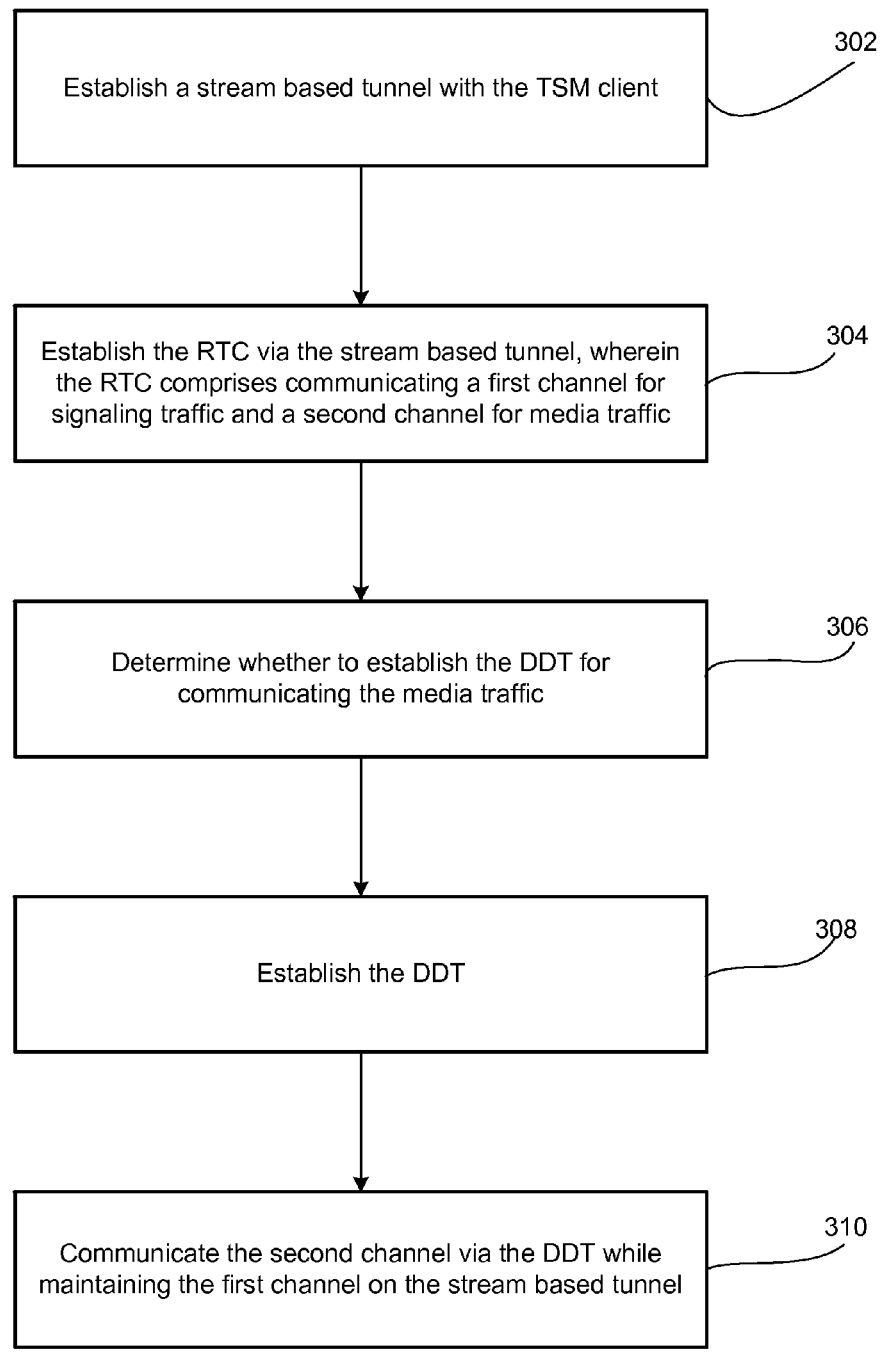
FIG. 3 is a flow diagram of the operation of the dynamic tunnel module of FIG. 2 when managing a dynamic tunnel in accordance with embodiments of the present invention.

FIG. 3 is a flow diagram of dynamic tunnel module 16 of FIG. 2 when managing a DDT in accordance with embodiments of the present invention. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, TSM server 116 establishes stream based tunnel 110 with the TSM client 102. For example, a TSM library at application 104 creates stream based tunnel 110 and once a SIP call is established on stream based tunnel 110 and RTP is negotiated by SDP information exchange, an RTP media socket is created on stream based tunnel 110.

At 304, TSM server 116 establishes RTC via stream based tunnel 110 with TSM client 102, where the RTC includes communicating first channel 130 for signaling traffic and second channel 132 for media traffic.

At 306, TSM server determines whether to establish DDT 112 for communicating media traffic, for example, based on a message received from TSM client 102 and/or dynamically based on the quality of stream based tunnel 110 and DDT 112. For example, to induce DDT 112 on RTP media socket, it is marked to run on a new separate datagram tunnel. When a binding function is executed on the RTP media socket and since it resides on stream based tunnel 110, the CSM at TSM client 102 sends a TSCF service request to TSM server 116 to initiate DDT services.

At 308, TSM server 116 establishes DDT 112 with the TSM client 102. For example, when TSM server 116 receives the TSCF service request, it reserves DDT 112 which is UDP or DTLS based if stream based tunnel 110 is TCP or TLS based, respectively. TSM server 116 sends a service response back to TSM client 102 indicating the TSCF TID of DDT 112. CSM then negotiates DDT 112 by sending a configuration request and processing the corresponding response. At this point, CSM moves RTP media socket from stream based tunnel 110 to DDT 112. While DDT 112 is being negotiated and until RTP media socket is moved from stream based tunnel 110 to DDT 112, all traffic sent/received by RTP media socket is on stream based tunnel 110.

At 310, TSM server 116 communicates second channel 132 via DDT 112 while maintaining first channel 130 on stream based tunnel 110.

As disclosed, embodiments use on-demand datagram tunnels in parallel with stream based tunnels for providing real time communication. This gives the end user the possibility of having secure real time communication that also meets real time application quality requirements.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a hardware processor, cause the processor to manage a dynamic datagram tunnel (DDT) for a real time communication (RTC) with a tunneled session management (TSM) client, the managing of the DDT comprising:
    establishing a stream based tunnel with the TSM client;
    establishing the RTC via the stream based tunnel, wherein the RTC comprises communicating a first channel for signaling traffic and a second channel for media traffic;
    determining whether to establish the DDT for communicating the media traffic;
    dynamically establishing the DDT after the determining; and
    communicating the second channel via the DDT while maintaining the first channel on the stream based tunnel;
    wherein after establishing the DDT, the signaling traffic is transmitted via the stream based tunnel and the media traffic is transmitted via the DDT;
    wherein when the stream based tunnel has a transmission control protocol (TCP), the DDT is established according to a user datagram protocol (UDP), and when the stream based tunnel has a transport layer security (TLS) protocol, the DDT is established according to a datagram transport layer security (DTLS) protocol;
    wherein both the stream based tunnel and the DDT traverse firewalls.

2. The computer-readable medium of claim 1, wherein the determining is based on a status of a switch at the TSM client.

3. The computer-readable medium of claim 1, wherein the determining is performed dynamically based on a quality of at least one of the stream based tunnel or the DDT.

4. The computer-readable medium of claim 1, wherein: the DDT is requested by a client application executed on the TSM client via an application programming interface (API).

5. The computer-readable medium of claim 1, wherein, during the establishing of the stream based tunnel, the TSM client creates a real time protocol (RTP) media socket, wherein the determining comprises:
receiving a client service request from the TSM client to initiate the DDT, wherein the RTP media socket is marked at the TSM client to be run on the DDT.

6. The computer-readable medium of claim 5, wherein the establishing of the DDT comprises:
sending a response to the TSM client including a tunnel identifier of the DDT; and
negotiating a configuration of the DDT with the TSM client.

7. The computer-readable medium of claim 6, wherein, upon completion of the negotiating, the TSM client moves the RTP media socket from the stream based tunnel to the DDT.

8. The computer-readable medium of claim 1, wherein, when the stream based tunnel is terminated, the DDT is also terminated.

9. The computer-readable medium of claim 1, wherein the stream based tunnel and the DDT have a same inner IP address.

10. The computer-readable medium of claim 1, wherein the stream based tunnel and the DDT run on a same port at the TSM client.

11. A method for managing a dynamic datagram tunnel (DDT) for a real time communication (RTC) with a tunneled session management (TSM) client, the method comprising:
establishing a stream based tunnel with the TSM client;
establishing the RTC via the stream based tunnel, wherein the RTC comprises communicating a first channel for signaling traffic and a second channel for media traffic;
determining whether to establish the DDT for communicating the media traffic;
dynamically establishing the DDT after the determining; and
communicating the second channel via the DDT while maintaining the first channel on the stream based tunnel;
wherein after establishing the DDT, the signaling traffic is transmitted via the stream based tunnel and the media traffic is transmitted via the DDT;
wherein when the stream based tunnel has a transmission control protocol (TCP), the DDT is established according to a user datagram protocol (UDP), and when the stream based tunnel has a transport layer security (TLS) protocol, the DDT is established according to a datagram transport layer security (DTLS) protocol;
wherein both the stream based tunnel and the DDT traverse firewalls.

12. The method claim 11, wherein the determining is based on a status of a switch at the TSM client.

13. The method of claim 11, wherein the determining is performed dynamically based on a quality of at least one of the stream based tunnel or the DDT.

14. The method of claim 11, wherein the DDT is requested by a client application executed on the TSM client via an application programming interface (API).

15. The method of claim 11, wherein, during the establishing of the stream based tunnel, the TSM client creates a real time protocol (RTP) media socket, wherein the determining comprises:
receiving a client service request from the TSM client to initiate the DDT, wherein the RTP media socket is marked at the TSM client to be run on the DDT.

16. A tunneled session management (TSM) system for managing a dynamic datagram tunnel (DDT) for a real time communication (RTC) with a TSM client in a network, the TSM system comprising:
a tunnel service control function (TSCF) module that:
establishes a stream based tunnel with the TSM client;
establishes the RTC via the stream based tunnel, wherein the RTC comprises communicating a first channel for signaling traffic and a second channel for media traffic;
determines whether to establish the DDT for communicating the media traffic;
dynamically establishes the DDT after the TSCF module determines to establish the DDT; and
communicates the second channel via the DDT while maintaining the first channel on the stream based tunnel;
wherein after establishing the DDT, the signaling traffic is transmitted via the stream based tunnel and the media traffic is transmitted via the DDT;
wherein when the stream based tunnel has a transmission control protocol (TCP), the DDT is established according to a user datagram protocol (UDP), and when the stream based tunnel has a transport layer security (TLS) protocol, the DDT is established according to a datagram transport layer security (DTLS) protocol;
wherein both the stream based tunnel and the DDT traverse firewalls.

17. The system of claim 16, wherein the determining is based on a status of a switch at the TSM client.

18. The system of claim 16, wherein the determining is performed dynamically based on a quality of at least one of the stream based tunnel or the DDT.

19. The system of claim 16, wherein the DDT is requested by a client application executed on the TSM client via an application programming interface (API).

* * * * *